(12) United States Patent
Sendonaris

(10) Patent No.: US 8,412,127 B2
(45) Date of Patent: Apr. 2, 2013

(54) HYBRID PHASE SWEEPING FOR MOBILE TRANSMIT DIVERSITY

(75) Inventor: Andrew Sendonaris, Los Gatos, CA (US)

(73) Assignee: QUALCOMM Incorporated, San Diego, CA (US)

(*) Notice: Subject to any disclaimer, the term of this patent is extended or adjusted under 35 U.S.C. 154(b) by 42 days.

(21) Appl. No.: 12/838,681

(22) Filed: Jul. 19, 2010

(65) Prior Publication Data

US 2011/0237208 A1    Sep. 29, 2011

Related U.S. Application Data

(60) Provisional application No. 61/317,873, filed on Mar. 26, 2010.

(51) Int. Cl.
*H04B 7/02* (2006.01)
(52) U.S. Cl. .................... 455/101; 375/267
(58) Field of Classification Search .......... 455/101, 455/102, 103, 561, 562.1, 272, 277.1, 277.2; 375/267, 347
See application file for complete search history.

(56) References Cited

U.S. PATENT DOCUMENTS

| | | | |
|---|---|---|---|
| 7,043,273 B2 * | 5/2006 | Sarresh et al. | 455/562.1 |
| 2002/0172293 A1 | 11/2002 | Kuchi et al. | |
| 2008/0227414 A1 * | 9/2008 | Karmi et al. | 455/101 |
| 2011/0053527 A1 * | 3/2011 | Hunzinger | 455/101 |

FOREIGN PATENT DOCUMENTS

| | | |
|---|---|---|
| EP | 1069706 A1 | 1/2001 |
| WO | WO2008113038 A1 | 9/2008 |
| WO | WO2010000275 A1 | 1/2010 |

OTHER PUBLICATIONS

International Search Report and Written Opinion—PCT/US2011/029630, ISA/EPO—Jul. 25, 2011.

* cited by examiner

*Primary Examiner* — Thanh Le
(74) *Attorney, Agent, or Firm* — Stanton Braden

(57) ABSTRACT

An improved method and apparatus for Mobile Transmit Diversity (MTD), or Uplink Transmit Diversity (ULTD) is disclosed. The mobile device either selects the best antenna at any given time, or transmits from both antennas using the best beam forming phase without feedback from the base station on which antenna to transmit from or which phase to use if using two antennas. Essentially operating in Open Loop MTD, a Hybrid Phase Sweeping algorithm requires testing of a fraction of phase hypotheses resulting in improved base station performance and higher data rates for the user.

25 Claims, 4 Drawing Sheets

HYBRID PHASE SWEEPING FOR MOBILE TRANSMIT DIVERSITY

CLAIM OF PRIORITY UNDER 35 U.S.C. §119

The present Application for patent claims priority to Provisional Application No. 61/317,873 entitled "HYBRID PHASE SWEEPING FOR MOBILE TRANSMIT DIVERSITY" filed Mar. 26, 2010, and assigned to the assignee hereof and hereby expressly incorporated by reference herein.

BACKGROUND

1. Field

The present invention relates generally to wireless communications, and more specifically to reducing transmit power and improving data rates in wireless communication systems.

2. Background

Minimizing transmit power and improving the data rate is a concern for all mobile devices. Specifically, dual-antenna mobiles must find the best way to utilize two transmit antennas to transmit information to the base station. This transmission method is known as Mobile Transmit Diversity (MTD) or Uplink Transmit Diversity (ULTD). The mobile device either selects the best antenna at any given time, or transmits from both antennas using the best beam forming phase. Currently, base stations do not provide feedback to mobile devices for optimizing antenna or phase selection. Without feedback from the base station on which antenna to transmit from or which phase to use if using two antennas, the mobile is operating in Open Loop MTD. In Open Loop MTD operation, the mobile device must autonomously determine the best antenna configuration and phase value for transmitting information.

Prior algorithms for optimizing antenna configuration and transmission phase have been found to be inordinately slow and/or inaccurate as well as the cause of phase tracking problems at base stations. There is therefore a need in the art for an Open Loop MTD transmission algorithm capable of operating at higher mobile data rates and maintaining base station phase tracking.

DETAILED DESCRIPTION

Figure 1:
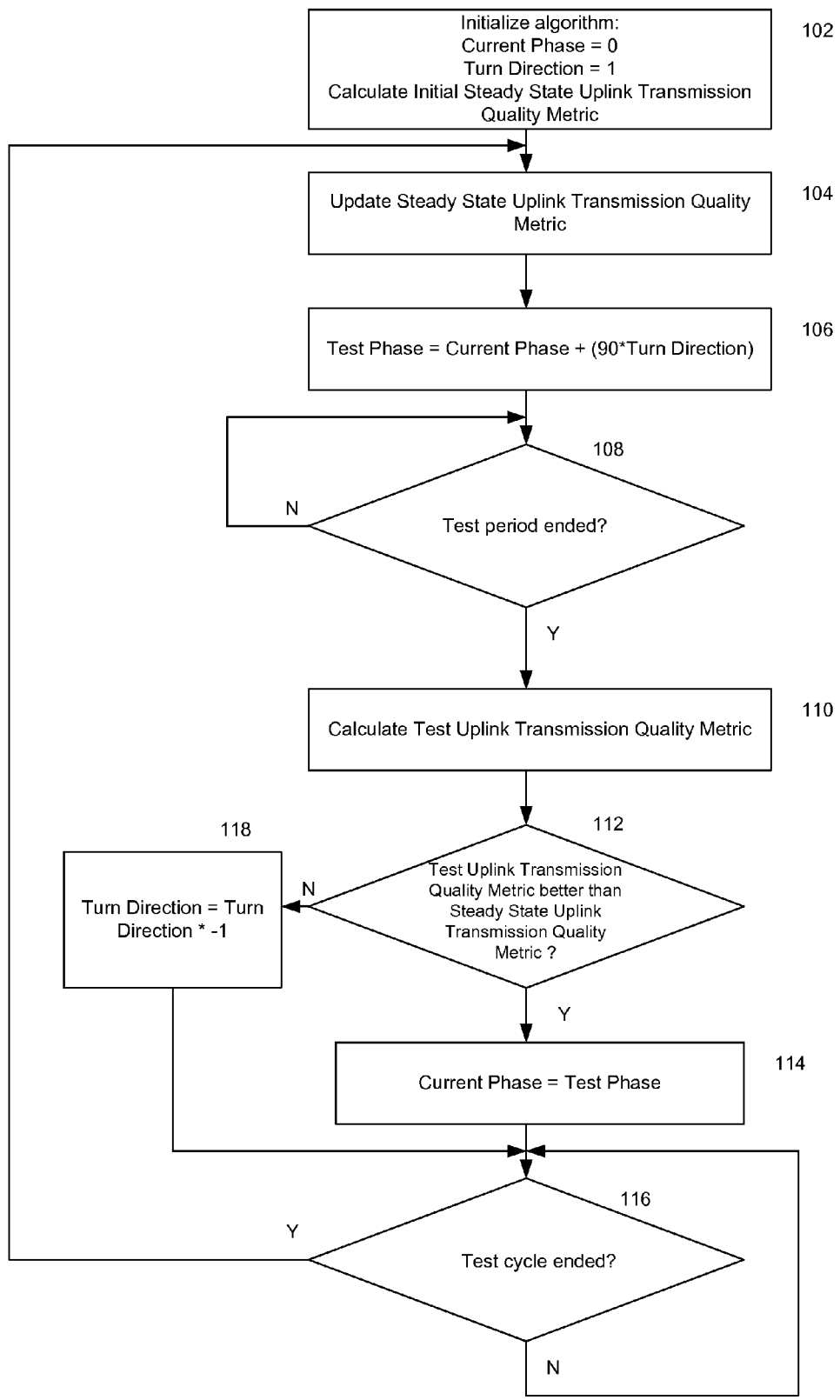
FIG. 1 is a is a flowchart illustrating an exemplary algorithm for hybrid phase sweeping Open Loop MTD.

The word "exemplary" is used herein to mean "serving as an example, instance, or illustration." Any embodiment described herein as "exemplary" is not necessarily to be construed as preferred or advantageous over other embodiments.

The term "mobile device" as used herein refers to a wireless communication device such as a cellular telephone, wireless terminal, user equipment, laptop computer, High Data Rate (HDR) subscriber station, access terminal, or other personal communication system (PCS) device.

The term "uplink transmission quality metric" as used herein may refer to a measurement of uplink transmission quality metric, average transmit pilot power, average transmit power, their equivalents in a specific system, or other measure of channel quality.

Various algorithms for Open Loop MTD operation have previously been developed by the assignee of the present invention with varying degrees of benefit. For example, a hypotheses testing algorithm transmitting from each antenna separately as well as both antennas using four different phases, selects the hypothesis with the minimum transmission power for a specified period. Exemplary hypothesis testing phases comprised 0, 90, 180 and 270 degrees during 100 millisecond (ms) cycles. Other variants of this algorithm having different cycle lengths only tested the four phase hypotheses, discarding both single antenna hypotheses and so on. This type of Open Loop MTD operation has drawbacks due to slowness and a hampered ability to keep up with the rate of channel characteristic changes in mobile environments. Another result of exhaustive phase testing is that a destructive phase or phases is always tested along with the good hypotheses. A destructive phase, 180 degrees removed from the desired best phase, causes the two antennas to cancel each other out resulting in a very weak signal at the base station. Testing all of the possible hypotheses every test cycle will always result in transmissions from the destructive phase, or worst phase for the two antennas.

In another embodiment of the algorithms previously developed by the assignee of the present invention, rather than hypotheses testing, power control commands may be used as a proxy for phase quality. Reactions to individual power control commands determine transmission phase, eliminating hypotheses testing periods and destructive phase testing. If a Down power control command is received by the mobile device, the current phase is deemed optimal and no phase change is made. If an Up power control command is received by the mobile device, instead of raising the transmission power, the phase is changed by 90 degrees for transmission power testing (i.e. 90 degrees is added to the current phase). If another Up power control command is received by the mobile device, still no power adjustment is made but the phase is changed by 90 degrees in the opposite direction (i.e 90 degrees is subtracted from the current phase). If a third Up power control command is received by the mobile, the mobile determines the channel itself has changed and raises the transmission power. In this manner, the mobile device controls transmission signal phase in response to each received power control command. In other words, the mobile device uses the power control commands from the base station to simulate closed loop feedback from the base station. However, this type of Open Loop MTD operation can potentially create phase changes too rapid for the base stations to track.

The algorithm embodiments for Open Loop MTD disclosed herein provide improved performance using a method for optimizing transmission power and data rates by testing fewer hypotheses to improve speed and enabling accurate phase tracking by base stations. Test phases are advantageously selected to avoid destructive phase interference. Because of steady state characteristics, a best phase assumption is made. The assumption that the mobile device is currently operating at the best phase is made because the best phase typically will not have changed 180 degrees, or all the way to the opposite phase during one test period. For example, if the current best phase is 270 degrees, in a ms or so the optimal transmission phase will not have changed from 270 degrees all the way to 90 degrees. If the optimal phase changes within this time period, it will only have changed to 0 or 180 degrees. Therefore, it is not necessary to test a 90 degree hypothesis, being the likely worst, or destructive phase.

The disclosed Open Loop MTD algorithm is a hybrid method comprised of phase hypotheses testing and uplink transmission quality metric measurements. Time is saved by making a best phase assumption and then testing only one phase hypothesis for a predetermined test period during a portion of an overall test cycle, where a steady state uplink transmission quality metric is averaged during the remainder of the cycle. A test uplink transmission quality metric for each test period is measured and compared to an overall steady state uplink transmission quality metric for the previous test cycle. In one embodiment pertaining to WCDMA standards, the test cycle is a period of 10 ms. In other embodiments, the test cycle may last N transmission frames or other predefined periods. The steady state transmit state uplink transmission quality metric calculated for the previous overall test cycle is compared to the test uplink transmission quality metric for the test period from the current cycle. If the test uplink transmission quality metric for the new test phase is better than the steady state uplink transmission quality metric from the previous test cycle, the transmission phase is changed to the new test phase and transmission continues using this phase. During each test cycle, the steady state uplink transmission quality metric is measured for comparison in the next test cycle. If the uplink transmission quality metric for the test period is worse than the steady state uplink transmission quality metric from the previous test cycle, we assume the phase direction change for the test period was not advantageous and the phase is changed in the opposite direction for the test period of the next test cycle. The uplink transmission quality metric for the test period may be determined to be worse if more transmit power or pilot transmit power was required, or another measure of the channel quality showed degradation. The uplink transmission quality metric for the test period may be determined to be better if less transmit power or pilot transmit power was required, or another measure of the channel quality showed improvement.

In one embodiment, a test cycle is 95 ms. In other embodiments, the length of the test cycle may vary. In the case where the test phase was not advantageous, transmission using the previously selected phase continues for the remainder of the test cycle. Thus, it is not necessary for the algorithm to react to each power control command and only one likely non-destructive phase is tested each test cycle.

FIG. 1 is a flowchart detailing the steps of an exemplary method for hybrid phase sweeping Open Loop MTD. The method details steps for saving time and processing resources by avoiding hypothesis testing of the detrimental phase option that is 180° from the current phase option. The method tests only one phase hypothesis per hypothesis testing period providing a rapid reaction to phase changes and enabling the MTD to work at higher data rates.

In step 102, Open Loop MTD is initialized. The current phase is set to 0 degrees or other initial phase value. A turn direction variable is initialized to 1. An initial value for the steady state uplink transmission quality metric is calculated for the initial test phase. Control flow proceeds to step 104.

In step 104, the steady state uplink transmission quality metric value is updated to equal the uplink transmission quality metric value from the retained phase of the previous test cycle. For the first test cycle, the steady state uplink transmission quality metric value retains its initialization value. Control flow proceeds to step 106.

In step 106, the test phase for the current test cycle is calculated. The test phase is calculated by either adding or subtracting 90 degrees from the current phase value. In other words, the test phase value makes either a right or left 90 degree turn from the current best phase. The Turn Direction is multiplied by 90 degrees and added to the current best phase for hypothesis testing during this test cycle. Control flow proceeds to step 108.

In step 108, the test phase hypothesis is tested for a predetermined period lasting a portion of the overall test cycle. In various embodiments, the test period is 5 ms of a 95 ms test cycle, 10 ms of a 100 ms test cycle, M frames of an N frame test cycle and so on. When the test period has ended, control flow proceeds to step 110.

In step 110, the test uplink transmission quality metric is calculated for the test phase during the test period. Control flow proceeds to step 112.

In step 112, the test uplink transmission quality metric value for the test phase calculated in step 110 is compared to the steady state uplink transmission quality metric value calculated in step 104. If the test uplink transmission quality metric is better than the steady state uplink transmission quality metric, the test phase is deemed a better phase than the current phase and control flow proceeds accordingly to step 114. Otherwise, the test phase is deemed inferior to the current phase and control flow proceeds to step 118 where the turn direction is reversed for the next test cycle by multiplying the current turn direction value by −1. Control flow then proceeds to step 116.

In step 114, the Current Phase is replaced by the Test Phase. Normal transmission continues using the new Current Phase, which also becomes the assumed best phase. Control flow proceeds to step 116.

In step 116, mobile device operation continues until the end of the test cycle. At the end of the test cycle, control flow proceeds to step 104 where the next test cycle begins. One skilled in the art would readily understand that other embodiments may modify the above steps by testing both a −90 degree and a +90 degrees hypothesis in each test cycle or alter the durations of the test periods and test cycles according to various communications standards.

Figure 2:
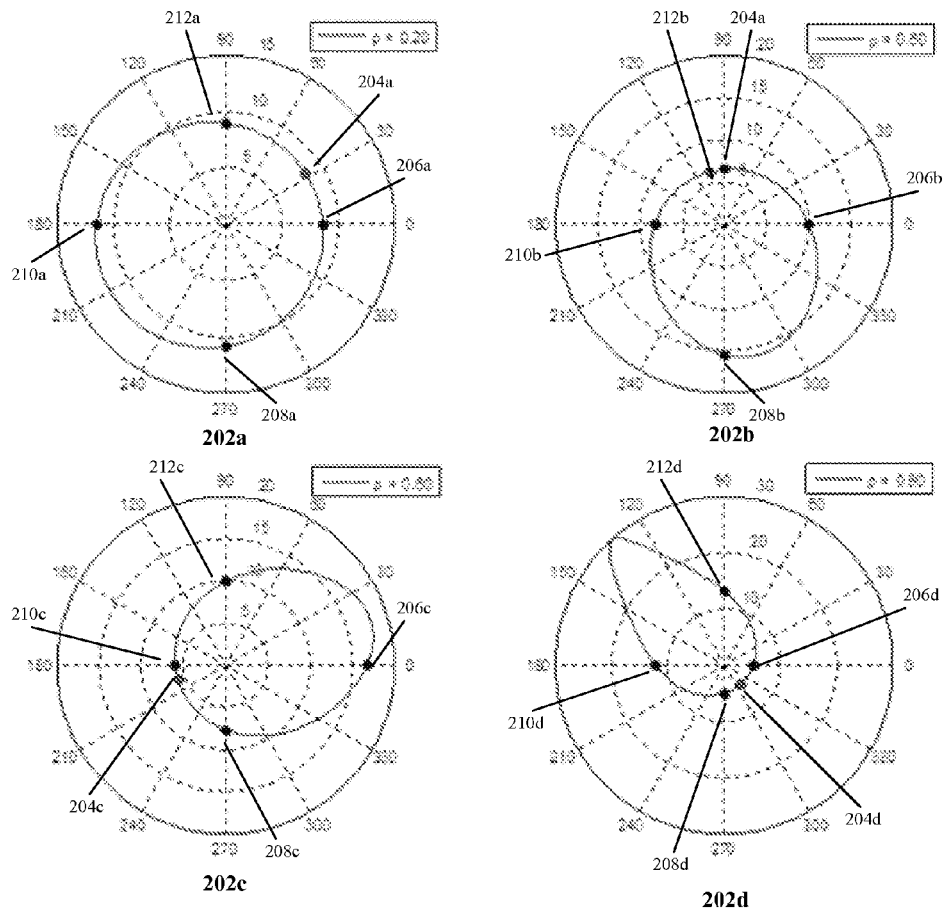
FIG. 2 illustrates exemplary transmit power plotted in decibels as a function of test phases applied to a secondary antenna of a mobile device.

FIG. 2 illustrates exemplary transmit power plotted in decibels as a function of test phases applied to a secondary antenna of a mobile device. Plot diagrams 202a, 202b, 202c and 202d correspond to antenna imbalance values of rho equal to 0.20, 0.50, 0.60 and 0.90 respectively.

Antenna imbalance represents the relative difference in the received (at the base station) average power from antenna 1 versus the received power from antenna 2. For example, if the mobile transmits 1 W (1 Watt) only from antenna 1, then the base station will receive power P1 from that mobile, whereas if the same mobile transmits 1 W only from antenna 2, then the base station will receive power P2 from that mobile. The ratio of P1/P2 (or equivalently the difference in the dB values of P1 and P2, i.e. P1(dB)−P2(dB)) represents the antenna imbalance. The value of rho in the plots represents sqrt(P1/P2), which is just a monotonic function of P1/P2, so is an equivalent way of looking at antenna imbalance. Antenna imbalance is due to a combination of basic, permanent, characteristics like the size of the antennas, the materials from which they are made and their location in the mobile, and also temporary issues like the location of the user's head and other objects in the environment that impede transmission from one antenna more than from the other. Antenna imbalance affects not only which of the two antennas will be received with a stronger power at the base station, but also, when transmitting from two antennas, affects the way the phase difference on the two antennas impacts the total received power at the base station.

In each diagram 202, dots labeled 204 represents the optimal phase corresponding to the lowest transmit power for the antenna configuration. The dots labeled 206, 208, 210, and 212 represent the four quantized phase choices. Dot 206 represents test phase 0 degrees. Dot 208 represents test phase 90 degrees. Dot 210 represents test phase 180 degrees. Dot 212 represents test phase 270 degrees.

From FIG. 2, we see that the transmit power follows an expected pattern according to the phase change on the secondary antenna. For example, in diagram 202b, the optimal phase 204b is approximately 105°, and so the best phase choice using our four quantized phase options 206b, 208b, 210b, 212b is to use the 90° phase option 208b. As time progresses and channel characteristics change, the optimal phase 204b may change accordingly.

Figure 3:
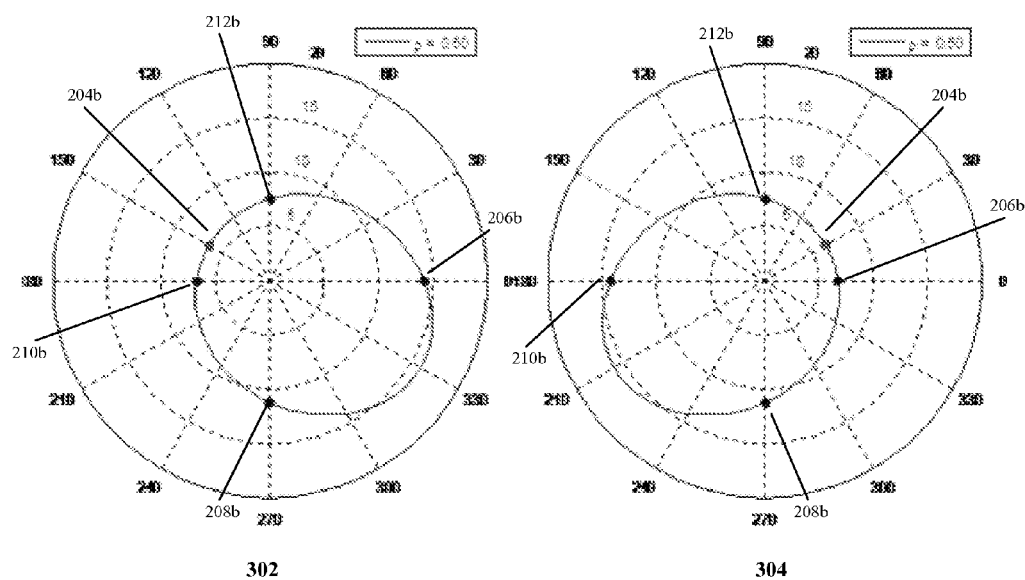
FIG. 3 illustrates optimal phase changes over time due to varying channel characteristics.

FIG. 3 illustrates the optimal phase 204b of diagram 202b changing over time. As time progresses and channel characteristics change, the optimal phase 204b may begin to move counter clockwise and at some point may reach 150° as shown in diagram 302. At this time, the best phase option becomes 180°. Conversely, the optimal phase 204b may move clockwise and at some point may reach 30° as shown in diagram 304. At this time, the best phase option becomes the 0° phase option.

By selecting only one test phase option for each test period and changing the direction of the test phase option according to the test uplink transmission quality metric, time and transmit power are not wasted testing the detrimental phase option that is 180° from the current phase option. Time and processing resources are saved by using only one hypothesis per hypotheses testing period. The disclosed embodiments react very quickly to phase changes, enabling the hybrid phase sweep Open Loop MTD to operate at higher speeds. Transmit power levels and antenna phase are changed less frequently, enabling improved base station tracking.

Thus, every test cycle, the phase option that is 90° to the left of the current phase is tested. The uplink transmission quality metric of the test phase option is compared to the steady state uplink transmission quality metric of the current phase choice. If the test phase choice improves the uplink transmission quality metric, the test phase becomes the current phase. Otherwise the current phase remains in use, and during the next test cycle, the test phase option that is 90° to the right or left of the current phase is tested.

Figure 4:
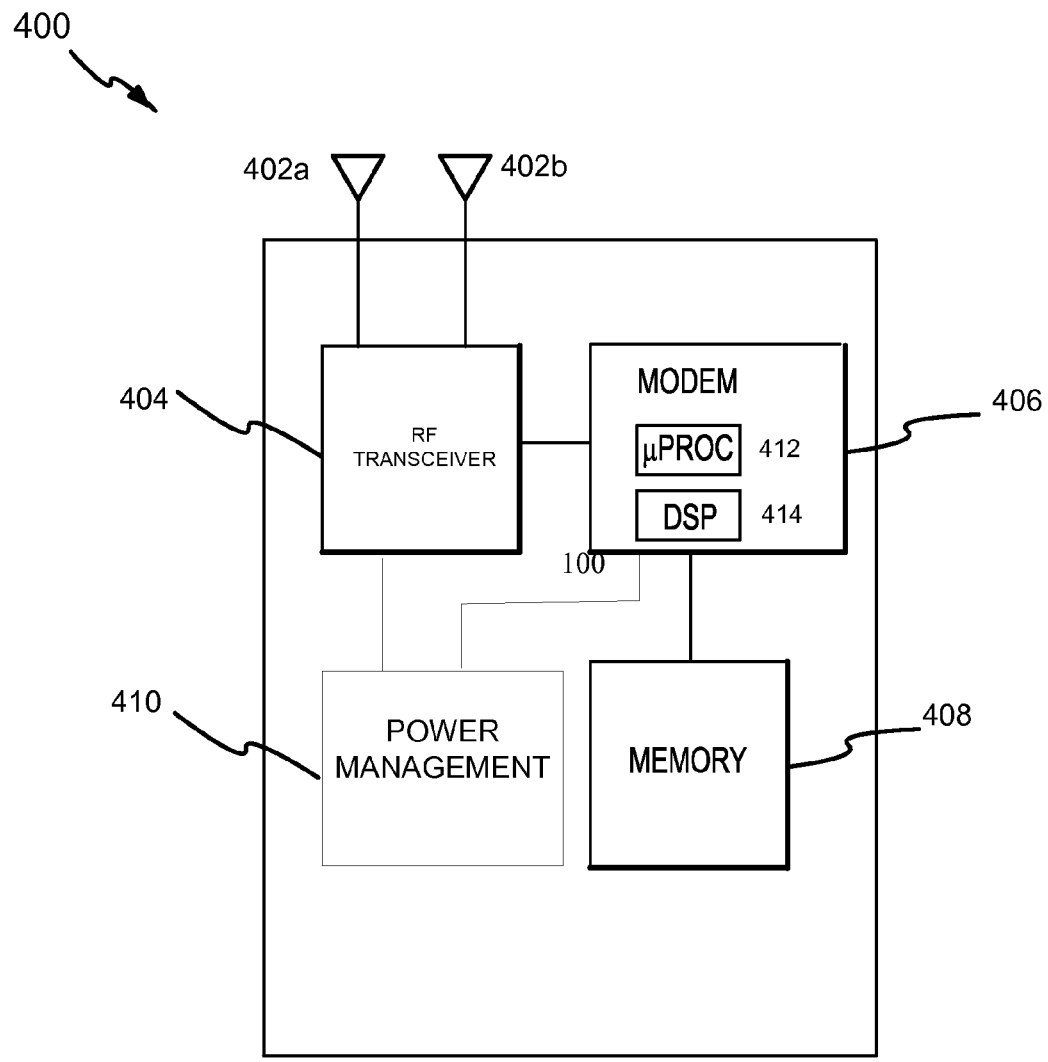
FIG. 4 is a block diagram illustrating an exemplary mobile device capable of hybrid phase sweeping Open Loop MTD.

FIG. 4 is a block diagram illustrating an exemplary mobile device capable of hybrid phase sweeping for mobile transmit diversity 400. Wireless device 400 comprises a wireless communication transceiver 404 and associated antennas 402a, 402b capable of sending and receiving wireless communication signals. Modem 406 comprises the appropriate microprocessor(s) 412, digital signal processor(s) 414 and other suitable hardware, such as a correlator bank, for processing signals. Power management 410 controls power for various components of wireless device 400. Memory 408 is coupled to modem 404 as necessary for implementing various modem processes and functionality for hybrid phase sweeping for mobile transmit diversity. Wireless device 400 may comprise an appropriate user interface with alphanumeric keypad, display, microphone, speaker, and other necessary components (not shown). It will be appreciated by those skilled in the art that Wireless device 400 may comprise a variety of components not shown.

The methodology for hybrid phase sweeping for mobile transmit diversity described herein may be implemented by suitable instructions operating on the microprocessor 412 and memory 408 of Wireless device 400, but is certainly not limited to such an implementation. The microprocessor 412 is connected to power management 410 and memory 408 having code or instructions directing the microprocessor 412 to perform hybrid phase sweeping for mobile transmit diversity. Memory 408 may comprise instructions for performing hybrid phase sweeping for mobile transmit diversity. The memory 408 may include RAM memory, flash memory, ROM memory, EPROM memory, EEPROM memory, registers, a hard disk, a removable disk, a CD-ROM, or any other form of storage medium or computer readable media known in the art. In an exemplary aspect, the control processor 412 executes instructions stored in memory 408 according to the steps of FIG. 1 to perform hybrid phase sweeping for mobile transmit diversity.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for Open Loop Mobile Transmit Diversity in a wireless communication system comprising:
   determining a set of transmission test phase hypotheses;
   selecting one of the set of transmission test phase hypotheses using a turn direction;
   calculating a test uplink transmission quality metric value for the selected test phase hypothesis during a test period of a test cycle using a turn direction;
   comparing the test uplink transmission quality metric value to a steady state uplink transmission quality metric value; and
   changing the test phase hypothesis for a next test cycle if the test uplink transmission quality metric value is worse than the steady state uplink transmission quality metric value, or using the test phase hypothesis as a current phase if the test uplink transmission quality metric value is better than the steady state uplink transmission quality metric value.

2. The method of claim 1 wherein the set of test phase hypotheses comprise 0, 90, 180 and 270 degrees.

3. The method of claim 1 wherein test period is 10 ms.

4. The method of claim 1 wherein the test cycle is 100 ms.

5. The method of claim 1 wherein the test period is 5 ms.

6. The method of claim 1 wherein the test period is M frames.

7. The method of claim 1 wherein the test cycle is N frames.

8. The method of claim 1 wherein the turn direction is 90 degrees.

9. A mobile device for Open Loop Mobile Transmit Diversity in a wireless communication system comprising:
   a wireless communications transceiver and associated antennas capable of sending and receiving wireless communications signals;
   a modem coupled to the transceiver comprising processor(s) for processing signals and executing code stored in a memory;
   a power management unit coupled to the modem and the transceiver for measuring and controlling transmit power; and
   a memory coupled to the modem for storing instructions for determining a set of transmission test phase hypotheses, selecting one of the set of transmission test phase hypotheses using a turn direction, calculating a test uplink transmission quality metric value for the selected test phase hypothesis during a test period of a test cycle using a turn direction, comparing the test uplink transmission quality metric value to a steady state uplink transmission quality metric value, and changing the test phase hypothesis for a next test cycle if the test uplink transmission quality metric value is worse than the steady state uplink transmission quality metric value, or using the test phase hypothesis as a current phase if the test uplink transmission quality metric value is better than the steady state uplink transmission quality metric value.

10. The mobile device of claim 9 wherein the set of test phase hypotheses comprises 0, 90, 180 and 270 degrees.

11. The mobile device of claim 9 wherein test period is 10 ms.

12. The mobile device of claim 9 wherein the test cycle is 100 ms.

13. The mobile device of claim 9 wherein the test period is 5 ms.

14. The mobile device of claim 9 wherein the test period is M frames.

15. The mobile device of claim 9 wherein the test cycle is N frames.

16. The mobile device of claim 9 wherein the turn direction is 90 degrees.

17. A device for Open Loop Mobile Transmit Diversity in a wireless communication system comprising:
   means for determining a set of transmission test phase hypotheses;
   means for selecting one of the set of transmission test phase hypotheses using a turn direction;
   means for calculating a test uplink transmission quality metric value for the selected test phase hypothesis during a test period of a test cycle;
   means for comparing the test uplink transmission quality metric value to a steady state unlink transmission quality metric value;
   means for changing the test phase hypothesis for a next test cycle if the test uplink transmission quality metric value is worse than the steady state uplink transmission quality metric value, or using the test phase hypothesis as a current phase if the test uplink transmission quality metric value is better than the steady state uplink transmission quality metric value.

18. A non-transitory computer readable medium having instructions stored thereon to cause a processor in a mobile device to:
   determine a set of transmission test phase hypotheses;
   select one of the set of transmission test phase hypotheses using a turn direction;
   calculate a test uplink transmission quality metric value for the selected test phase hypothesis during a test period of a test cycle using a turn direction;
   compare the test uplink transmission quality metric value to a steady state uplink transmission quality metric value; and
   change the test phase hypothesis for a next test cycle if the test uplink transmission quality metric value is worse than the steady state uplink transmission quality metric value, or using the test phase hypothesis as a current phase if the test uplink transmission quality metric value is better than the steady state uplink transmission quality metric value.

19. The non-transitory computer readable medium of claim 18 wherein the set of test phase hypotheses comprises 0, 90, 180 and 270 degrees.

20. The non-transitory computer readable medium of claim 18 wherein test period is 10 ms.

21. The non-transitory computer readable medium of claim 18 wherein the test cycle is 100 ms.

22. The non-transitory computer readable medium of claim 18 wherein the test period is 5 ms.

23. The non-transitory computer readable medium of claim 18 wherein the test period is M frames.

24. The non-transitory computer readable medium of claim 18 wherein the test cycle is N frames.

25. The non-transitory computer readable medium of claim 18 wherein the turn direction is 90 degrees.

* * * * *